US007205377B2

(12) United States Patent
Ingelbrecht et al.

(10) Patent No.: US 7,205,377 B2
(45) Date of Patent: *Apr. 17, 2007

(54) METHOD FOR THE PREPARATION OF A POLY(ARYLENE ETHER), AND RELATED COMPOSITIONS

(75) Inventors: Hugo Gerard Eduard Ingelbrecht, Essen (BE); Alexey Kruglov, Glenmont, NY (US); Gert-Jan Schoenmakers, Prinsenbeek (NL)

(73) Assignee: General Electric Company, Schenectady, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/953,723

(22) Filed: Sep. 29, 2004

(65) Prior Publication Data
US 2006/0069229 A1 Mar. 30, 2006

(51) Int. Cl.
*C08G 65/38* (2006.01)
*C08G 65/44* (2006.01)

(52) U.S. Cl. .................. 528/217; 528/212; 528/214; 528/502 R; 528/503; 264/50; 264/45.9

(58) Field of Classification Search ............... 528/217, 528/212, 214, 502 R, 503; 264/50, 45.9
See application file for complete search history.

(56) References Cited

U.S. PATENT DOCUMENTS 4,246,398 A   1/1981   Sugio et al.
6,407,200 B1  6/2002   Singh et al. ............ 528/217
6,472,499 B1  10/2002  Braat et al. ............ 528/215

FOREIGN PATENT DOCUMENTS

| EP | 0627466 A2 | 12/1994 |
|----|------------|---------|
| EP | 1167421 A2 | 1/2002  |
| WO | WO03000769 A2 | 1/2003 |

OTHER PUBLICATIONS

International Search Report; International Application No. PCT/US2005/038952; International Filing Date Oct. 28, 2005; Date of Mailing Mar. 21, 2006 (5 pgs).

*Primary Examiner*—Duc Truong
(74) *Attorney, Agent, or Firm*—Cantor Colburn LLP (57) ABSTRACT

A method for preparing a poly(arylene ether) with a reduced level of powder fines is described. In one embodiment, the method comprises oxidatively coupling a monohydric phenol in the presence of a solvent and a complex metal catalyst, to produce a poly(arylene ether) resin; and then removing a portion of the solvent to produce a concentrated solution having a cloud point $T_{cloud}$. The concentrated solution is then combined with an anti-solvent to precipitate the poly(arylene ether) in the form of a precipitation mixture. The concentrated solution usually has a temperature of at least about ($T_{cloud}$–10° C.) immediately before it is combined with the anti-solvent. The precipitation mixture has a temperature of at least about ($T_{cloud}$–40° C.) after its formation. Related poly(arylene ether) copolymers are also described.

36 Claims, 2 Drawing Sheets

METHOD FOR THE PREPARATION OF A POLY(ARYLENE ETHER), AND RELATED COMPOSITIONS

BACKGROUND OF THE INVENTION

This invention generally relates to synthetic resins. More specifically, it relates to methods for preparing poly(arylene ether) polymers useful in high-temperature applications.

Poly(arylene ether) resins are commercially attractive materials because of their unique combination of physical, chemical, and electrical properties. The resins are usually characterized by a desirable combination of hydrolytic stability, high dimensional stability, toughness, heat resistance, and dielectric properties. They also exhibit high glass transition temperature (Tg) values, typically in the range of about 150° C.–215° C., as well as very good mechanical performance.

Poly(arylene ether)'s such as the family of polyphenylene ether (PPE) resins are often used in combination with other polymers, to further enhance the attributes of the ultimate polymer product. For example, PPE resins are often combined with polyamides. The resulting molded products exhibit the most desirable properties of each material, e.g., excellent heat resistance and dimensional stability from the PPE, and excellent strength and chemical resistance from the polyamide. End use applications for structural materials of this type include computer housings, automotive panels, and the like.

In recent years, it has been desirable to further increase the high-temperature capabilities of materials like the poly (arylene ether)/polyamide blends. For example, automotive panels made from such materials need to withstand relatively high paint oven temperatures when the parts are coated. One means of increasing the temperature capabilities of the polymers has been to employ certain copolymers for the poly(arylene ether) component. For example, European Patent Application 627,466 describes the preparation of poly(arylene ether) copolymers of 2,6-dimethylphenol and 2,3,6-trimethylphenol. Copolymers of this type are often characterized by relatively high Tg values, e.g., in the range of about 225° C. to about 230° C.

A variety of methods for preparing and isolating poly (arylene ether) homopolymers and copolymers are well-known in the art. Many are described in the background section of U.S. Pat. No. 6,407,200 (P. Singh et al). One well-established method for isolating the polymers involves combining the polymerization reaction mixture with an anti-solvent such as methanol, and then filtering the resulting precipitate.

Many variations on the general technique of precipitation and filtration have been developed over the years. For example, the European application mentioned above describes the isolation of a poly(arylene ether) copolymer by reverse-precipitation with acetone, and filtration. Other techniques also involve pre-concentration steps, wherein a portion of the reaction solvent is removed prior to precipitation steps.

The isolated polymer is then subjected to additional, conventional processing steps. For example, the polymer can sometimes be re-slurred with the anti-solvent, then filtered again, and then washed with additional solvent. Conventional solid/liquid separation techniques include filtration, solid bowl centrifuges, gravity settling, and the like. After these additional steps, the polymer is usually dried by various procedures. For example, drying can be carried out at elevated temperatures, under atmospheric pressure or reduced pressure, using various types of industrial drying equipment, e.g., pneumatic conveying dryers, screw-conveying dryers, or fluid bed dryers. The resulting product, in powder form, is then typically transported to other locations for storage or compounding. In large commercial plants, transport is often undertaken by pneumatic systems, through a network of pipes.

The procedures described above are often suitable for efficiently producing high yields of the desired poly(arylene ether) product. However, there are some drawbacks to the processes. For example, the poly(arylene ether) powder produced by these techniques sometimes includes an undesirably high proportion of powder "fines". As used herein, the term "fines" refers to solid particles having a particle size less than about 38 microns (micrometers).

Fines can be responsible for a variety of problems during the processing of the polymer. Their presence may be associated with losses of the poly(arylene ether) during the filtration and drying stages. Fines tend to stick to the processing line filters, where they can cause clogging and an excessive pressure drop. (Filter pressure drops may trigger alarms which shut off the powder transport through a transport line, e.g., from a resin silo to a silo in a compounding area). In general, the presence of high powder fines can make it difficult to efficiently separate the polymer powder from gas in the drying and transport systems, resulting in the accumulation of fines in vent systems, and possible dust emissions into the atmosphere. Removal of the fines from the filters can be a difficult and time-consuming task. Moreover, the presence of fines can create dust explosion hazards if powder-handling involves contact with air, thus requiring the installation of expensive safety equipment.

In addition to transport and flow problems, the presence of fines can also result in significant problems during extrusion and molding of the polymer product. For example, though they constitute part of the solid powder composition, fines often do not have the minimum, solid mass and density necessary for proper flow, into and through an extruder. Thus, the appropriate shearing forces for extruding the polymer product may not be attainable when too many fines are present.

With these concerns in mind, attempts have been made to reduce the level of fines in a solid polymer product, such as the poly(arylene ether) materials. One strategy for this objective involves changing the process conditions under which the polymer product is made. For example, the previously-referenced U.S. Pat. No. 6,407,200 describes a method of preparing poly(arylene ether)'s, wherein a portion of the reaction solvent is removed after the catalyzed oxidative reduction step. Removal of the solvent portion leaves a concentrated solution of the polymer product. This solution is subsequently combined with an anti-solvent (as mentioned above), to precipitate the desired polymer product. The inventors associated with the referenced patent discovered that if the temperature of the concentrated solution was elevated to specified levels immediately before combination with the anti-solvent, the generation of the undesirable fines could be reduced.

U.S. Pat. No. 6,407,200 documents a considerable innovation in poly(arylene ether) preparation and processing—especially in the area of fines reduction. However, additional improvements in this area of technology would also be of great interest—especially in an era when the demands for ever-higher product yields and product quality are present. Thus, there remains a need for improved processes for preparing poly(arylene ether)'s.

The new processes should result in greater reductions in fines-content for the powder products, and an improvement in powder flow behavior. The processes should also be compatible with the production of the high-temperature poly(arylene ether) copolymers discussed above, which are also in great demand today. Moreover, the processes should be economically adaptable to a large-scale manufacturing facility, e.g., without significant changes in facility structure or processing requirements. Furthermore, the overall properties for products molded from the polymer material should be substantially maintained.

BRIEF DESCRIPTION OF THE INVENTION

A method for preparing a poly(arylene ether) is described. In one embodiment, the method comprises the following steps:
(a) oxidatively coupling a monohydric phenol in the presence of a solvent and a complex metal catalyst, to produce a poly(arylene ether) resin;
(b) removing a portion of the solvent to produce a concentrated solution having a cloud point $T_{cloud}$; and
(c) combining the concentrated solution with an anti-solvent to precipitate the poly(arylene ether) in the form of a precipitation mixture;
wherein the concentrated solution has a temperature of at least about ($T_{cloud}$–10° C.) immediately before it is combined with the anti-solvent; and
wherein the precipitation mixture has a temperature of at least about ($T_{cloud}$–40° C.) after its formation.

Another embodiment is directed to a poly(arylene ether) copolymer powder, comprising 2,6-dimethyl-1,4-phenylene ether units and 2,3,6-trimethyl-1,4-phenylene ether units. The copolymer usually has an intrinsic viscosity of about 0.25 dL/g to about 0.5 dL/g, and contains less than about 18% by weight of particles smaller than about 38 micrometers.

Further details regarding the various features of this invention are found in the remainder of the specification.

DETAILED DESCRIPTION OF THE INVENTION

In terms of general structure, the poly(arylene ether) polymers which can be prepared and treated according to this invention are known in the art. Many of them are described in U.S. Pat. Nos. 3,306,874; 3,306,875; and 3,432,469 (Hay); U.S. Pat. No. 4,806,602 (White et al); U.S. Pat. No. 4,806,297 (Brown et al); U.S. Pat. No. 5,294,654 (Hellstern-Burnell et al); and U.S. Pat. No. 6,407,200 (Singh et al), all incorporated herein by reference. These polymers are usually prepared by oxidatively coupling a monohydric phenol, using an oxygen-containing gas in the presence of a solvent and a complex metal catalyst.

The monohydric phenol comprises at least one structural unit of the formula wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy, wherein at least two carbon atoms separate the halogen and oxygen atoms; and each $Q^2$ is independently selected from the group consisting of hydrogen, halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy, wherein at least two carbon atoms separate the halogen and oxygen atoms.

In some preferred embodiments, the monohydric phenol comprises 2,6-dimethylphenol (hereinafter "DMP") and 2,3,6-trimethylphenol (hereinafter "TMP"). The DMP and TMP may be used in any proportion, from weight ratios of 99:1 to 1:99. However, it is often preferable to use a DMP/TMP weight ratio of about 1:1 to about 20:1. The oxidative coupling of the monohydric phenol uses an oxygen-containing gas, which is typically oxygen ($O_2$) or air, with oxygen being preferred.

As mentioned above, the monohydric phenol is oxidatively coupled in the presence of a solvent. A wide variety of solvents may be employed. Non-limiting examples of suitable solvents include: aliphatic alcohols, ketones, aliphatic and aromatic hydrocarbons; chlorohydrocarbons, nitrohydrocarbons, ethers, esters, amides, mixed ether-esters, sulfoxides, and the like. Combinations which comprise at least one of the foregoing solvents may also be used, providing they do not interfere with or enter into the oxidation reaction. In a preferred embodiment, the solvent comprises a $C_6$–$C_{18}$ aromatic hydrocarbon, including, for example, toluene, xylenes, and the like, and mixtures thereof. A highly preferred solvent is toluene. (As used herein, the term "solvent" is meant to define a single solvent, or two or more solvents mixed together).

In some embodiments, the solvent further comprises at least one aliphatic alcohol that is a poor solvent for the poly(arylene ether). Non-limiting examples include $C_3$–$C_8$ aliphatic alcohols such as n-propanol, isopropanol, n-butanol, t-butanol, n-pentanol, and the like; as well as combinations comprising at least one of the foregoing alcohols. A preferred alcohol of this type is n-butanol. The solvent may further comprise methanol or ethanol, which act as anti-solvents for the poly(arylene ether).

The $C_6$–$C_{18}$ aromatic hydrocarbon, the $C_3$–$C_8$ aliphatic alcohol, and the methanol or ethanol may be combined in various proportions. However, it is sometimes preferred that the solvent comprise at least about 50 weight % of the $C_6$–$C_{18}$ aromatic hydrocarbon. In some especially preferred embodiments, the solvent comprises at least about 75 weight % of the $C_6$–$C_{18}$ aromatic hydrocarbon.

As mentioned above, the oxidative coupling reaction is carried out in the presence of a complex metal catalyst. Catalysts of this type are well-known in the art. They are described, for example, in U.S. Pat. Nos. 6,407,200; 3,306,875; 3,306,874, referenced above, as well as U.S. Pat. Nos. 5,068,310; 4,755,566; and 4,092,294, which are also incorporated herein by reference.

The complex metal catalyst system usually comprises a metal ion, such as ions from Group VIIB, VIIB, VIII, or IB of the Periodic Table, and combinations thereof. Of these, ions of chromium, manganese, cobalt, copper, and combinations comprising at least one of the foregoing ions, may be preferred, with copper ions ($Cu^+$ and $Cu^{++}$) being highly preferred.

The complex metal catalyst system may further comprise a nitrogen-containing ligand. The nitrogen-containing ligand may include, for example, alkylenediamine ligands, primary monoamines, secondary monoamines, tertiary monoamines, aminoalcohols, oxines, combinations comprising at least one of the foregoing nitrogen-containing ligands, and the like.

A variety of specific examples of the nitrogen-containing ligands are provided in the patents referenced above, such as U.S. Pat. No. 6,407,200. Non-limiting examples of the alkylenediamine ligands include N,N'-di-t-butylethylenediamine and N,N,N',N'-tetramethyl-1,3-diaminopropane. Non-limiting examples of the primary monoamines are n-butylamine, sec-butylamine, and cyclohexylamine, with n-butylamine being highly preferred. Non-limiting examples of the secondary amines include di-n-propylamine, di-n-butylamine, and di-t-butylamine, with di-n-butylamine often being preferred. Non-limiting examples of the tertiary amines include triethylamine, dimethyl-n-butylamine, and various cyclic tertiary amines, with dimethyl-n-butylamine being highly preferred. Non-limiting examples of suitable aminoalcohols include N,N-diethylethanolamine, triethanolamine, and N-phenylethanolamine. Non-limiting examples of the oxines include oxine and 5-methyloxine. Various combinations of any of these amines, and compositions which contain such combinations, may also be used.

Most of the nitrogen-containing ligands mentioned above, when present, may be used at about 0.01 to about 25 moles per 100 moles of monohydric phenol. The tertiary monoamines may be used at about 0.1 to about 1,500 moles per 100 moles of monohydric phenol. Selection of appropriate concentrations within these ranges may be made by those of ordinary skill in the art, without undue experimentation. The selected concentrations may reflect the presence of other reaction components or products, such as water, that may affect catalyst efficiency. A suitable molar ratio of complex metal catalyst (measured as moles of metal) to phenol is about 1:50 to about 1:400, with about 1:100 to about 1:200 often being preferred.

The complex metal catalyst system may, optionally, further include a halide ion, such as chloride, bromide, or iodide. When employed, halide ions may be supplied to the reaction mixture in the form of an alkali metal salt or an alkaline earth metal salt, at a concentration of about 0.1 mole to about 150 moles per 100 moles of phenolic monomer.

In some preferred embodiments, the complex metal catalyst comprises copper ion, a secondary alkylenediamine ligand, a secondary monoamine, and a tertiary monoamine. In a highly preferred embodiment, the complex metal catalyst comprises copper ion, N,N'-di-t-butylethylenediamine, di-n-butylamine, and dimethyl-n-butylamine.

Various techniques can be used to initially prepare the poly(arylene ether). In very general terms, a reaction vessel can be first be charged with the reaction solvent, a portion of the poly(arylene ether) monomer(s), the complex metal catalyst, and any other conventional components, such as surfactants and the like. A stream of oxygen or an oxygen-containing gas can then be introduced into the reaction vessel, while the remainder of the poly(arylene ether) monomer is added over a period of time. The sequence and schedule for monomer-addition can vary considerably. Polymerization can then be carried out, until a polymer with the desired molecular weight is obtained. As those skilled in the art understand, polymerization can be carried out as a bulk process or a continuous process.

The polymerization process conditions, such as reaction time, temperature, oxygen flow rate, and the like, may be modified based on the target molecular weight and monomer composition. The endpoint of the polymerization may conveniently be determined with an in-line viscosity meter.

Other procedures may also be carried out during the process. Examples include: making molecular weight measurements, running to a predetermined reaction time, and controlling to a specified end group concentration.

Temperatures maintained during the polymerization stage can vary significantly, e.g., from about 0° C. to about 95° C. Within this range, a polymerization temperature of at least about 25° C. is often preferred, with a preferred maximum temperature of about 55° C. At temperatures substantially higher than about 95° C., side reactions can occur, leading to reaction by-products. At temperatures substantially lower than about 0° C., ice crystals may form in the solution.

The polymerization process may further include the step of recovering the complex metal catalyst with an aqueous solution. As described in U.S. Pat. Nos. 6,407,200 and 3,838,102 (also incorporated herein by reference), a wide variety of extractants or chelating agents may be used to complex with the catalyst after the end of the polymerization reaction. When these materials are added to the poly(arylene ether) reaction solution, the complex metal catalyst becomes poisoned, and further oxidation does not take place.

Non-limiting examples of the extractants and chelating agents include sulfuric acid, acetic acid, ammonium salts, bisulfate salts, and various polyfunctional carboxylic acid-containing compounds. Preferred chelating agents for some embodiments include ethylenediaminetetraacetic acid (EDTA) or nitrilotriacetic acid (NTA), or various salts of these materials. Mixtures which comprise individual extractants or chelating agents could also be employed. Furthermore, as described in U.S. Pat. No. 6,407,200, the chelated metal catalyst can be extracted with the water produced in the polymerization reaction, by using a liquid/liquid centrifuge. Alcohols or water/alcohol mixtures are often used as the extraction liquid.

The polymerization reaction medium may comprise an aqueous environment. As described in U.S. Pat. No. 6,407, 200, anti-solvents can be used in combination with the aqueous media to help drive the precipitation of the copper (I) species. The anti-solvents used in this stage are often low-molecular weight aliphatic and aromatic hydrocarbons, ketones, alcohols, and the like. Those skilled in the art would be able to select the most appropriate type and amount of anti-solvent for the polymerization stage.

In preferred embodiments of this invention, a portion of the reaction solvent is removed after polymerization of the poly(arylene ether), to produce a concentrated solution. This concentration step, sometimes referred to as "pre-concentration", is often carried out after removal of the complex metal catalyst. In those instances in which the poly(arylene ether) is based on a combination of monohydric phenols, such as DMP and TMP, the concentrated solution has a cloud point, "$T_{cloud}$". (As discussed below, homopolymers can sometimes exhibit a cloud point as well).

The cloud point $T_{cloud}$ is a property of the polymer solution, and is a function of polymer concentration and molecular weight. $T_{cloud}$ corresponds to the temperature at which turbidity is first observed for a cooling solution of a poly(arylene ether). The $T_{cloud}$ is influenced by various factors, such as: the poly(arylene ether)'s monomer composition, intrinsic viscosity, and concentration, as well as the identity of the solvent being employed. A detailed procedure for determining $T_{cloud}$ for a given reaction system is provided in U.S. Pat. No. 6,407,200. In brief, the $T_{cloud}$ value for a specific poly(arylene ether) dissolved in a specific solvent may be determined by preparing the solution in its homogeneous state, and then gradually decreasing the temperature until turbidity is first observed. By measuring $T_{cloud}$ values for variations in poly(arylene ether) monomer composition, intrinsic viscosity, and concentration, it is possible to derive an equation relating $T_{cloud}$ to these variables, for any poly(arylene ether)/solvent system.

The pre-concentration step mentioned above is usually carried out to produce a concentrated solution having about 20 to about 60 weight % of the poly(arylene ether). However, determining the most appropriate poly(arylene ether) level depends on various factors, such as the type of solvent used, and the intrinsic viscosity of the poly(arylene ether). The minimum concentration for some embodiments is preferably at least about 25 weight %, and more preferably, at least about 30 weight %. The maximum concentration for some embodiments is preferably about 55 weight %, and more preferably, about 50 weight %. In some especially preferred embodiments, the maximum weight % is about 45 weight %.

In terms of the $T_{cloud}$ measurement discussed above, the pre-concentration step is often carried out at a temperature of at least about ($T_{cloud}$–10° C.), and preferably, at a temperature of at least about ($T_{cloud}$–5° C.). In a more preferred embodiment, the temperature is at least about ($T_{cloud}$), or at least about ($T_{cloud}$+5° C.). In some highly preferred embodiments, the temperature is at least about ($T_{cloud}$+10° C.).

Any suitable method for pre-concentration may be employed. For example, the pre-concentration may be carried out by pre-heating the reaction solution above its atmospheric boiling point, at a pressure modestly elevated above about 1 atmosphere. (In this manner, no boiling takes place in the heat-exchanger typically employed). The solution can then be flashed to a lower pressure and temperature, whereby vaporization of a substantial portion of the solvent takes place. The required heat-of-vaporization is supplied by the heat transferred in the heat exchanger, as sensible heat of the solution.

The process of this invention further comprises combining the concentrated solution with an anti-solvent, so as to precipitate the poly(arylene ether). The concentrated solution preferably has a temperature of at least about ($T_{cloud}$–10° C.), immediately before it is combined with the anti-solvent. As described in U.S. Pat. No. 6,407,200, this specified temperature characteristic for the concentrated solution results in reduced fines. In more preferred embodiments, the concentrated solution preferably has a temperature of at least about ($T_{cloud}$–5° C.) at this stage, immediately before it is combined with the anti-solvent. However, as described in U.S. Pat. No. 6,407,200, even higher temperatures may be utilized in some instances. For example, an especially preferred temperature is $T_{cloud}$, with a temperature of ($T_{cloud}$+5° C.) being employed at times. The most preferred temperature in some situations is ($T_{cloud}$+10° C.).

As mentioned above, the temperature of the concentrated solution is specified for the time period immediately before combination with the anti-solvent. "Immediately before" in this context means the specified temperature as it is combined with the anti-solvent. As a practical matter, the temperature of the concentrated solution may be determined at any time within about 30 seconds of mixing with the anti-solvent. Another way of expressing the temperature limitation is to say that the process comprises removing a portion of the solvent to produce a concentrated solution having a cloud point $T_{cloud}$, adjusting the temperature of the concentrated solution to at least about ($T_{cloud}$–10° C.), and combining the concentrated solution with an anti-solvent to precipitate the poly(arylene ether).

In a preferred embodiment, the concentrated solution has a temperature greater than $T_{cloud}$, and is homogeneous immediately before it is mixed with the anti-solvent. Homogeneity of the solution corresponds to the absence of any turbidity in the solution, and may be determined by the same visual observation techniques employed for $T_{cloud}$ determination In some especially preferred embodiments, a temperature of at least about ($T_{cloud}$+5° C.) is maintained in the poly(arylene ether)-containing solution from the beginning of the concentration step, to the moment immediately before the resulting concentrated solution is combined with the anti-solvent.

In some embodiments, the temperature of the concentrated solution is at least about 60° C., and preferably, at least about 70° C. More preferably, the temperature is at least about 80° C., and most preferably, at least about 90° C. (It should be noted that solutions of the homopolymer poly(2,6-dimethyl-1,4-phenylene ether) in aromatic solvents such as toluene typically do not exhibit a cloud point, except, possibly, at relatively low temperatures. Rather, as such solutions of the homopolymer are concentrated, they may form a gelatinous phase without the discrete solid particles characteristic of a cloud point).

A variety of anti-solvents may be combined with the concentrated solution to precipitate the poly(arylene ether). Non-limiting examples include alcohols having one to about ten carbon atoms, such as methanol, and the like; ketones having three to about ten carbon atoms, such as acetone, and the like; and alkanes having about five to about ten carbon atoms, such as hexane; and the like. Combinations comprising at least one of the foregoing anti-solvents may also be employed. A preferred anti-solvent comprises methanol, e.g., a solvent mixture containing at least about 50 weight % methanol (i.e., "methanol-based").

A highly preferred anti-solvent for many embodiments comprises about 70 to about 100 weight % methanol; 0 to about 20 weight % toluene, and 0 to about 10 weight % water. The anti-solvent may be employed at a range of amounts relative to the amount of the organic solvent, with the optimum amount depending on the identities of the organic solvent and anti-solvent, as well as the concentration, intrinsic viscosity, and monomer composition of the poly(arylene ether) product. For example, when the poly(arylene ether) is a random copolymer having an intrinsic viscosity of 0.36 dL/g and a composition of about 82 weight % 2,6-dimethyl-1,4-phenylene ether units and about 18 weight % 2,3,6-trimethyl-1,4-phenylene ether units; the organic solvent is toluene; and the anti-solvent is methanol, a toluene/methanol weight ratio of about 1:1.5 to about 1:5 may be suitable.

The precipitation mixture which is formed when the anti-solvent is combined with the concentrated solution should have a temperature of at least about ($T_{cloud}$–40° C.), after its formation. As used herein, "after its formation" generally refers to the specified temperature during the time period in which the anti-solvent is combined with the concentrated solution. As a practical matter, the temperature of the precipitation mixture is usually determined at any time within about 5 minutes of the beginning of the stage in which the anti-solvent is combined with the concentrated solution.

In many preferred embodiments, the precipitation mixture has a temperature of at least about ($T_{cloud}$–30° C.) after its formation, and more preferably, at least about ($T_{cloud}$–20° C.) after its formation. In some embodiments, the precipitation mixture has a temperature of at least about ($T_{cloud}$) after its formation. In most larger-scale situations, however, the maximum precipitation mixture temperature is about 2°–3° C. lower than the boiling point of the solvent mixture, due in part to the complications which can arise when the solvent and anti-solvent begin to evaporate on a large scale.

However, in other embodiments, e.g., when the solids content of the poly(arylene ether) in the concentrated solution is lower than usual (for example, in the range of about 15 weight % to about 25 weight %), the temperature of the precipitation mixture could be as high as about ($T_{cloud}$+10° C.). In those instances, steps may have to be taken to control solvent and anti-solvent loss. For example, the precipitation system (or sections thereof) could be operated under pressure.

As further illustrated below, the present inventors have discovered that the increase in precipitation mixture temperature (as compared to prior art processes) can result in a greatly decreased level of fines. Different techniques may be available for bringing the precipitation mixture temperature to the prescribed level, and maintaining it at that level. For example, conventional equipment may be used to heat the precipitation mixture in the precipitation vessel, as the mixture is formed.

However, in preferred embodiments, the desired precipitation mixture temperature is obtained by introducing the anti-solvent at a selected temperature. The appropriate temperature for the anti-solvent depends on a variety of well-understood factors, such as: the identity of the reaction solvent and anti-solvent; the specific heat values of the individual solvents employed; the ratio of the volume of the concentrated solution of poly(arylene ether) to the volume of anti-solvent; the concentration of the polymer in the solution; and the molecular weight of the polymer. Those skilled in the art can select the most appropriate anti-solvent temperature, based on these factors, and on empirical observation for a given precipitation system. A non-limiting illustration for some embodiments is as follows: when the selected temperature for the precipitation mixture is about ($T_{cloud}$–40° C.), the anti-solvent usually has a temperature of at least about ($T_{cloud}$–45° C.) to about ($T_{cloud}$–50° C.), immediately before being combined with the concentrated solution.

A brief, non-limiting illustration for precipitation mixture temperatures can be provided for a typical process for the preparation of a poly(arylene ether) copolymer. (The Examples below provide further illustrations). For a larger-scale process which utilizes a toluene- or xylene-based solvent, and a methanol-based anti-solvent, and wherein the solids concentration in the concentrated solution is about 35 weight % to about 41 weight %, the precipitation mixture can have a temperature of at least about 44° C. after its formation. In some preferred embodiments, the precipitation mixture temperature may be at least about 48° C. In some especially preferred embodiments, the precipitation mixture has a temperature of at least about 51° C.

A variety of types of equipment can be used to carry out the precipitation step. For example, precipitation can be carried out in a stirred tank vessel, or a high-shear impeller. Suitable high shear impellers are commercially available from, for example, Wilhelm Siefer GmbH & Co., Velbert, Germany. The shear rates during precipitation in the stirred tank and in the high shear homogenizer may be about 500 $sec^{-1}$ to about 50,000 $sec^{-1}$. Those skilled in chemical engineering are very familiar with other details regarding the precipitation operation.

Usually, the precipitated poly(arylene ether) is then isolated, using any conventional filtration or solid/liquid separation technique. Suitable filtration apparatuses include rotating filters, continuous rotary vacuum filters, continuous moving bed filters, batch filters, and the like. Suitable solid/liquid separation apparatuses include continuous solid/liquid centrifuges.

The filtered poly(arylene ether) is then usually washed, using conventional techniques. Washing may be performed, for example, with additional anti-solvent directly on the filter. Alternatively, the "powder wetcake" from the filter or solid/liquid separation apparatus can be mixed with additional anti-solvent in a stirred tank.

A preferred method of washing the filtered poly(arylene ether) uses a two-stage re-slurry and solid/liquid separation process technique. In this embodiment, the wetcake from the filter may be washed with anti-solvent in a stirred tank. The poly(arylene ether)/solvent/anti-solvent mixture can then be separated in a solid/liquid continuous centrifuge. After separation in the centrifuge, the poly(arylene ether) wetcake can be mixed a second time with anti-solvent in a continuous stirred tank, followed by a second solid/liquid separation in a second solid/liquid centrifuge.

As alluded to previously, the precipitated poly(arylene ether) is characterized by a reduced level of fines, as a result of the process described herein. Usually, the level of fine particles (i.e., those less than 38 microns in size) is less than about 18% by weight, and more preferably, less than about 15% by weight. In some especially preferred embodiments, the level of fines is less than about 12% by weight. As described previously, poly(arylene ether) powder of this type is more free-flowing (i.e., with a higher flow index) than powder with greater amounts of fines. Consequently, the powder is much less likely to cause substantial transport problems, e.g., those relating to clogged filters. Other potential problems during further processing (e.g., compounding and molding) may also be reduced or eliminated.

The intrinsic viscosity of the poly(arylene ether) formed by the process described herein can vary greatly. For some applications, it may be preferred to use a poly(arylene ether) having an intrinsic viscosity of at least about 0.20 dL/g, and more preferably, at least about 0.25 dL/g, as measured in chloroform at 25° C. In some especially preferred embodiments, the intrinsic viscosity is at least about 0.30 dL/g.

An exemplary method for preparing a poly(arylene ether) copolymer can now be described. The illustrative copolymer is based on a combination of 2,6-dimethylphenol and 2,3,6-trimethylphenol. (As mentioned above, copolymers of this type are often characterized by relatively high Tg values). The method comprises: oxidatively coupling 2,6-dimethylphenol and 2,3,6-trimethylphenol, using an oxygen-containing gas in the presence a complex copper catalyst and a solvent system comprising toluene, xylene, or toluene/xylene mixtures, to produce the poly(arylene ether) copolymer resin. A portion of the solvent is then removed, to provide a concentrated solution having a cloud point $T_{cloud}$. The concentrated solution is then combined with an anti-solvent to precipitate the poly(arylene ether). In preferred embodiments, the concentrated solution has a temperature, T, immediately before it is combined with the anti-solvent. As described in U.S. Pat. No. 6,407,200, T satisfies the inequality:

$$T > [[\phi_S - (0.296 \times IV + 1.27 \times TMP - 35.7]/[1.97(1 - 0.00795 \times IV - 0.0249 \times TMP] - 10),$$

wherein $\phi_S$ is the polymer concentration (expressed in weight %), IV is the intrinsic viscosity of the copolymer in chloroform at 25° C. (expressed in mL/g), and TMP is the 2,3,6-trimethylphenol content of the copolymer (expressed in weight %). Moreover, the precipitation mixture which is formed when the anti-solvent is combined with the concentrated solution in this embodiment has a temperature of at least about ($T_{cloud}$–40° C.).

In another exemplary embodiment, the method of preparing a poly(arylene ether) comprises: oxidatively coupling 2,6-dimethylphenol and 2,3,6-trimethylphenol, using an oxygen-containing gas in the presence a complex copper catalyst and a solvent system comprising toluene, xylene, or toluene/xylene mixtures, to produce a poly(arylene ether) copolymer resin; wherein the weight ratio of 2,6-dimethylphenol to 2,3,6-trimethylphenol is about 3:1 to about 6:1; recovering the complex metal catalyst with an aqueous solution; removing a portion of the solvent to produce a concentrated solution comprising about 30 to about 45 weight % of the poly(arylene ether) copolymer resin and having a cloud point $T_{cloud}$; and combining the concentrated solution with a methanol-based anti-solvent to precipitate the poly(arylene ether) in the form of a precipitation mixture. In this exemplary embodiment, the concentrated solution has a temperature of at least about ($T_{cloud}$+5° C.) immediately before it is combined with the anti-solvent; while the precipitation mixture has a temperature of at least about ($T_{cloud}$–40° C.) after its formation. The precipitated poly(arylene ether) has an intrinsic viscosity of about 0.25 to about 0.50 dL/g.

In still another exemplary embodiment, the method of preparing a poly(arylene ether) comprises: oxidatively coupling 2,6-dimethylphenol and 2,3,6-trimethylphenol, using an oxygen-containing gas in the presence a complex copper catalyst and a solvent system comprising toluene, xylene, or toluene/xylene mixtures, to produce a poly(arylene ether) copolymer resin; wherein the weight ratio of 2,6-dimethylphenol to 2,3,6-trimethylphenol is about 3:1 to about 6:1; recovering the complex metal catalyst with an aqueous solution; removing a portion of the solvent to produce a solution having about 30 to about 45 weight % poly(arylene ether); and combining the concentrated solution with a methanol-based anti-solvent to precipitate the poly(arylene ether). In this embodiment, the concentrated solution has a temperature of at least about 80° C. immediately before it is combined with the anti-solvent; and the precipitation mixture has a temperature of at least about 44° C. after its formation. The precipitated poly(arylene ether) has an intrinsic viscosity of about 0.25 to about 0.50 dL/g.

Another embodiment is directed to a composition of matter, often in powder form. The composition comprises a poly(arylene ether), such as those described previously, in the form of powder. In preferred embodiments, the poly(arylene ether) is a copolymer which contains both 2,6-dimethyl-1,4-phenylene ether units and 2,3,6-trimethyl-1,4-phenylene ether units. The weight ratio of 2,6-dimethyl-1,4-phenylene ether units to 2,3,6-trimethyl-1,4-phenylene ether units is often about 1:1 to about 20:1. In especially preferred embodiments, the weight ratio of 2,6-dimethyl-1,4-phenylene ether units to 2,3,6-trimethyl-1,4-phenylene ether units is about 3:1 to about 6:1. The copolymer often has a Tg of at least about 220° C. An important characteristic of such a composition is its minimized level of fines, as described above. Thermoplastic compositions based on any of the poly(arylene ether) materials described herein represent another embodiment of the invention. Non-limiting examples include polyphenylene ether/polyamide blends.

EXAMPLES

The examples which follow are merely illustrative, and should not be construed to be any sort of limitation on the scope of the claimed invention.

Example 1

This example is a general illustration of the synthesis and isolation of a poly(arylene ether) copolymer. (The temperature of the precipitation mixture in this instance was below that specified for the present invention). The copolymer had 18 weight % of repeating units derived from 2,3,6-trimethylphenol and 82 weight % of units derived from 2,6-dimethylphenol. In a reactor were combined cuprous oxide ($Cu_2O$; 0.027 kg, obtained from American Chemet as purple copper) dissolved in hydrobromic acid (0.423 kg as 48% aqueous solution, CAS Reg. No. 10035-10-6, obtained from Great Lakes); N,N'-di-t-butylethylenediamine (0.119 kg, DBEDA, CAS Reg. No. 4062-60-6 obtained from Celanese); di-n-butylamine (1.616 kg, DBA, CAS Reg. No. 111-92-2, obtained from Celanese); N,N-dimethylbutylamine (2.675 kg, DMBA, CAS Reg. No. 927-62-8, obtained from Celanese); a tetraalkylammonium chloride surfactant (0.059 kg, CAS Reg. No. 5137-55-3, obtained from Cognis as Aliquat); 2,6-dimethylphenol (5.361 kg), and toluene solvent (140.06 kg). Over the course of the polymerization reaction, additional 2,6-dimethylphenol (30.377 kg) was added, along with 2,3,6-trimethylphenol (7.845 kg).

During the polymerization, the nitrogen flow rate was 61.3 liters/minute; the oxygen flow rate was 46.2 liters/minute; and the temperature increased gradually from 29.4° C. to 55.0° C. After the completion of the polymerization reaction, the copper catalyst was separated from the polymer by mixing the reactor effluent with an aqueous solution of nitrilotriacetic acid (0.871 kg as a 60% solution in water, CAS Reg. No. 139-13-9, obtained from Solutia). The two phase-solution was separated, using a liquid-liquid centrifuge. The polymer phase was concentrated to 38 weight % polymer by flashing toluene at atmospheric pressure. The product copolymer was precipitated from the concentrated polymer solution by combining the solution (at 88° C.) in a stirred tank vessel with methanol (at 15° C.) at 1:2 weight/weight ratio of polymer solution:methanol. The resulting slurry was passed through a rotary vacuum filter, and the wetcake was re-slurred with methanol. This slurry was centrifuged, and the separated solid particles were dried in a rotary paddle dryer.

Example 2

This example demonstrates the effect of two parameters on the generation of fines, during the precipitation process. (As mentioned above, fines are particles smaller than 38 micrometers). The two parameters are: (1) concentrated solution temperature, and (2) precipitation mixture temperature. For this example, the "precipitation mixture temperature" parameter is expressed in terms of anti-solvent temperature. (As described above, increasing the anti-solvent temperature is the most preferred technique for increasing the precipitation mixture temperature).

The method of Example 1 was used to prepare a poly(arylene ether) random copolymer having an intrinsic viscosity of 39.6 mL/g, and 18.3 weight % of repeating units derived from TMP. A sample of the isolated powder copolymer was then dissolved in toluene to generate a 20 weight % solution. The precipitation was conducted batch-wise in a stirred vessel provided with a high shear mixer, operated at a rotating speed of 15,000 rpm, to achieve high shear mixing. At the start of the experiment, the anti-solvent was present in the vessel. The anti-solvent contained 78.1 weight % methanol, 19.4 weight % toluene, and 2.5 weight % water. Then, the poly (arylene ether) solution in toluene—at a solids concentration of 20 weight %, was added within 2 minutes to the vessel in a 1:3 weight/weight ratio of poly (arylene ether)/toluene solution to anti-solvent.

Sample A constituted one "run" of the combination of the concentrated solution (20 weight % poly(arylene ether)) with the anti-solvent. For this sample, the temperature of the poly(arylene ether)/toluene solution that was added to the methanol anti-solvent was 47° C., which was designated as a relatively "Low" temperature. The temperature of the methanol anti-solvent was 40° C., immediately before combination with the concentrated solution. This anti-solvent temperature was also designated as a relatively "Low temperature". The resulting temperature of the precipitation mixture after formation was about 43–46° C.

Sample B constituted another run of the combination of the concentrated solution of poly(arylene ether) with the anti-solvent. For this sample, the temperature of the poly (arylene ether)/toluene solution that was added to the methanol anti-solvent was 72° C., which was designated as a relatively "High" temperature. The temperature of the methanol anti-solvent was the same ("Low") as for sample A, i.e., 40° C. The resulting temperature of the precipitation mixture after formation was about 48° C.

Sample C constituted another run of the combination of the concentrated solution of poly(arylene ether) with the anti-solvent. For this sample, the temperature of the poly (arylene ether)/toluene solution that was added to the methanol anti-solvent was 72° C., as for sample B, i.e., a relatively "High" temperature. The temperature of the methanol anti-solvent was about 62–64° C., immediately before combination with the concentrated solution. This anti-solvent temperature was designated as a relatively "High" temperature (as compared to sample B). The resulting temperature of the precipitation mixture after formation was about 61–64° C.

The precipitation mixture temperature was held constant during the precipitation stage. The precipitated copolymer was then filtered over a Schliccher and Schull "Black Ribbon" filter paper on a Buchner filter, while vacuum was applied. After filtration, the remaining filter-cake was washed with 1,200 grams of methanol. Subsequently, the washed filter-cake was dried in a vacuum oven at 125° C. for about 4 hours.

For each example, the particle size distribution of the precipitated copolymer was determined by using a PSD Analyzer obtained from Malvern Instruments Ltd., which employs a laser diffraction technique to sort particles into six size categories: less than 38 micrometers, 38–63 micrometers, 63–125 micrometers, 125–425 micrometers, 425–710 micrometers, and greater than 710 micrometers.

Figure 1:
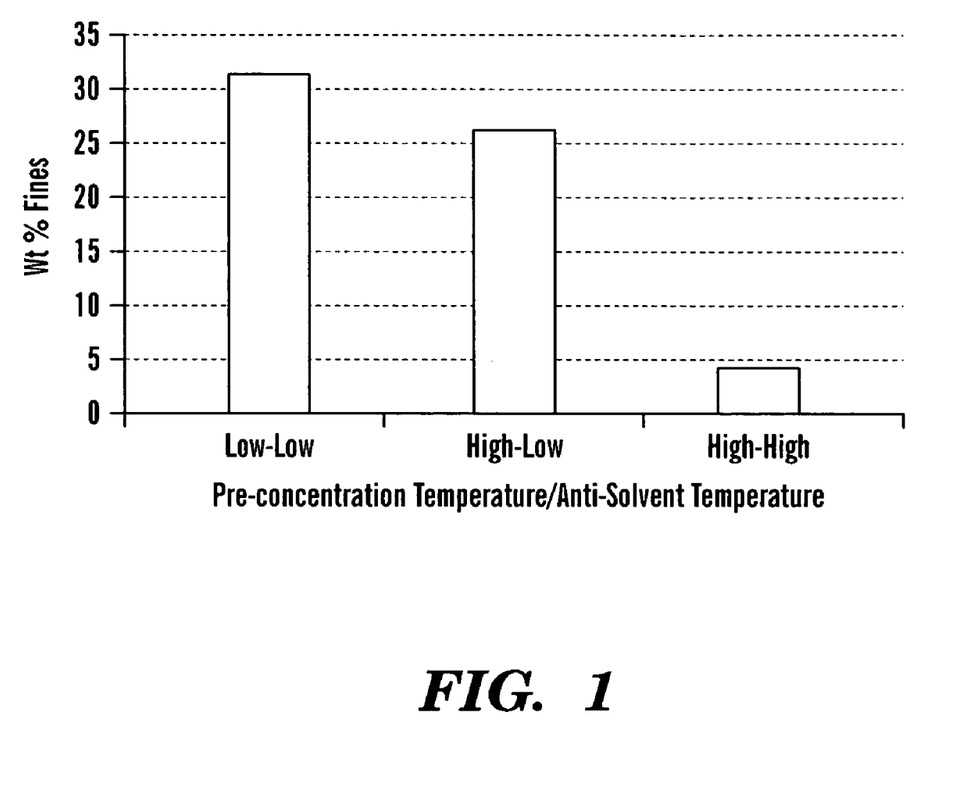
FIG. 1 is a graph depicting the percentage of powder-particle fines as a function of temperature parameters for a polymer-precipitation experiment.

FIG. 1 is a graph in which the percentage of particle fines is expressed as a function of temperature parameters for the concentrated solution and for the precipitation mixture (i.e., anti-solvent temperature). Sample A ("Low-Low"), wherein both temperature parameters were maintained at relatively low levels, exhibited a considerable concentration of fines, i.e., about 32 weight %. For sample B ("High-Low"), in which the concentrated solution temperature was raised, there was a noticeable reduction in fines content (to about 27 weight %). This reduction in fines content was the basis for the invention of U.S. Pat. No. 6,407,200.

Sample C ("High-High") was based on the teachings of the present invention, and included the increase in both the concentrated solution temperature and the anti-solvent temperature. As shown in FIG. 1, sample C exhibited a dramatic decrease in fines content, as compared to sample A and sample B. The percentage of fines decreased to about 5 weight % or less.

Example 3

The method of Example 1 was again used to prepare a poly(arylene ether) random copolymer having an intrinsic viscosity of 38 mL/g, and 18 weight % of repeating units derived from TMP. A sample of the isolated powder copolymer was then dissolved in toluene to generate a 38 weight % solution.

In this experiment, the precipitation step was carried out according to the general procedure outlined in Example 2, using the concentrated polymer phase (38 weight % polymer in toluene), as well as the methanol anti-solvent. For a series of individual samples, the temperature of the concentrated solution was held constant at about 90° C., before combination with the anti-solvent. However, for those samples, the temperature of the precipitation mixture was varied, from about 43° C. to about 51° C. (The precipitation mixture temperature was varied by changing the temperature of the anti-solvent being introduced).

Figure 2:
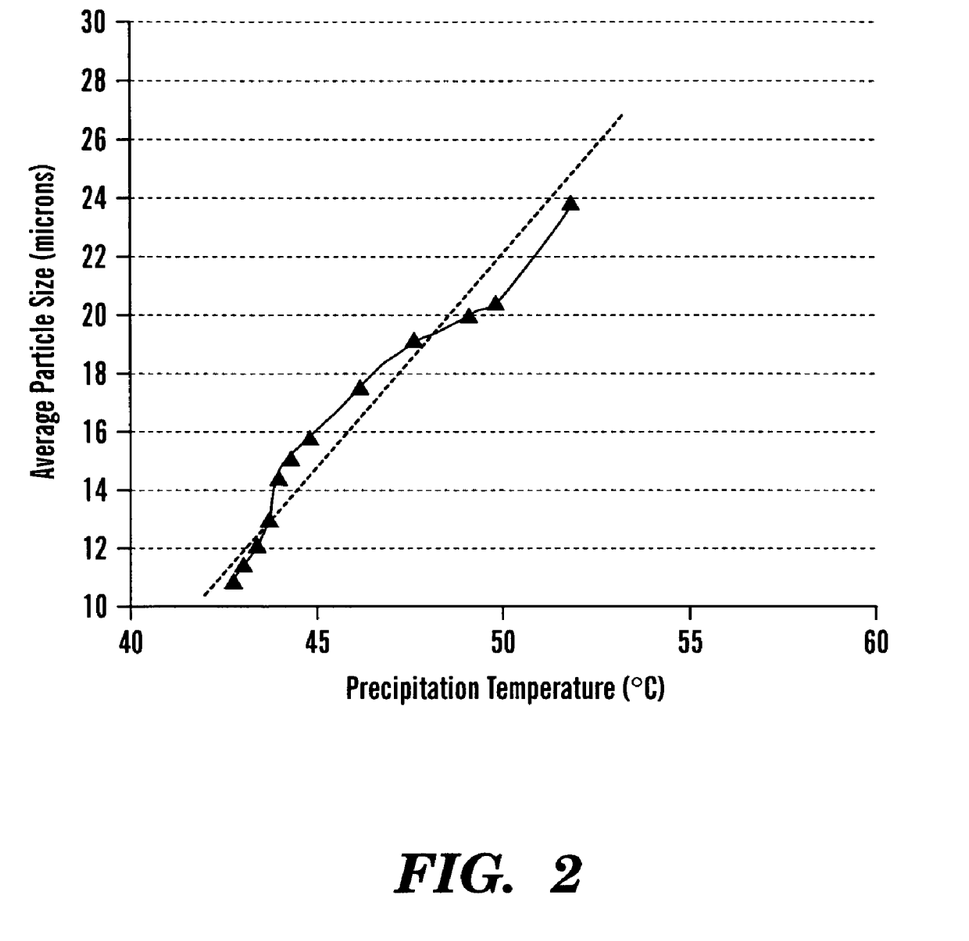
FIG. 2 is a graph which expresses polymer particle size as a function of precipitation mixture temperature.

FIG. 2 is a graph which expresses polymer particle size as a function of precipitation mixture temperature. The particle size was determined in-line, using a conventional laser-based technique. Such a measurement involves analysis of the powder within the liquid-based precipitation mixture. The measurement is carried out at a selected stage of the process, i.e., prior to the filtration and drying steps in this instance. Moreover, it had previously been determined that there is a strong correlation between the mean particle size of the in-line measurement and the percentage of fines in the final dried powder. For example, the in-line measurement of 23 microns (Y-axis, FIG. 2) corresponds to a fines content of less than about 12% in the dried powder.

The data which serves as the basis for FIG. 2 demonstrate that an increase in precipitation-mixture temperature resulted in a generally-linear increase in average particle size (dashed line). The increase in average particle size reduces the amount of fines present in the final polymer product, with the desirable benefits described previously.

This invention has been described according to specific embodiments and examples. However, various modifications, adaptations, and alternatives may occur to one skilled in the art, without departing from the spirit and scope of the claimed inventive concept. All of the patents, articles, and texts which are mentioned above are incorporated herein by reference.

What is claimed is:

1. A method for preparing a poly(arylene ether), comprising the following steps:
   (a) oxidatively coupling a monohydric phenol in the presence of a solvent and a complex metal catalyst, to produce a poly(arylene ether) resin;
   (b) removing a portion of the solvent to produce a concentrated solution having a poly(arylene ether) concentration of about 30 to about 60 weight percent and a cloud point $T_{cloud}$; and
   (c) combining the concentrated solution with an anti-solvent to precipitate the poly(arylene ether) in the form of a precipitation mixture;

wherein the concentrated solution has a temperature of at least about ($T_{cloud}-10°$ C.) immediately before it is combined with the anti-solvent; and wherein the precipitation mixture has a temperature of at least about $T_{cloud}$ after its formation.

2. The method of claim 1, wherein the monohydric phenol comprises at least one structural unit of the formula wherein each $Q^1$ is independently selected from the group consisting of halogen, $C_1$–$C_7$ primary or secondary alkyl, phenyl, $C_1$–$C_7$ haloalkyl, $C_1$–$C_7$ aminoalkyl, $C_1$–$C_7$ hydrocarbonoxy, and $C_2$–$C_7$ halohydrocarbonoxy, wherein at least two carbon atoms separate the halogen and oxygen atoms; and each $Q_2$ is independently selected from the group consisting of hydrogen, halogen, $C_1$–$C_7$ primary or secondary alkyl, phenyl, $C_1$–$C_7$ haloalkyl, $C_1$–$C_7$ hydrocarbonoxy, and $C_2$–$C_7$ halohydrocarbonoxy, wherein at least two carbon atoms separate the halogen and oxygen atoms.

3. The method of claim 1, wherein the monohydric phenol comprises 2,6-dimethylphenol and 2,3,6-trimethylphenol.

4. The method of claim 3, wherein the weight ratio of 2,6-dimethylphenol to 2,3,6-trimethylphenol is in the range of about 1:1 to about 20:1.

5. The method of claim 1, wherein the anti-solvent has a temperature of at least about ($T_{cloud}-45°$ C.) immediately before being combined with the concentrated solution.

6. The method of claim 1, wherein the precipitation mixture has a temperature of at least about ($T_{cloud}+10°$ C.) after its formation.

7. The method of claim 1, wherein the anti-solvent has a temperature of at least about ($T_{cloud}-50°$ C.) immediately before being combined with the concentrated solution.

8. The method of claim 1, wherein the solvent comprises a $C_6$–$C_{18}$ aromatic hydrocarbon.

9. The method of claim 8, wherein the solvent is selected from the group consisting of toluene, xylene, and mixtures which contain at least one of toluene and xylene.

10. The method of claim 8, wherein the solvent further comprises a $C_3$–$C_8$ aliphatic alcohol.

11. The method of claim 8, wherein the solvent further comprises methanol, ethanol, or a mixture comprising at least one of methanol and ethanol.

12. The method of claim 1, wherein the anti-solvent is selected from the group consisting of alcohols having 1 to about 10 carbon atoms; ketones having about 3 to about 10 carbon atoms; alkanes having about 5 to about 10 carbon atoms; and combinations comprising at least one of the foregoing materials.

13. The method of claim 12, wherein the anti-solvent comprises methanol.

14. The method of claim 1, wherein the complex metal catalyst comprises at least one metal ion selected from Group VIB, VIIB, VIII or IB of the Periodic Table.

15. The method of claim 14, wherein the complex metal catalyst comprises copper ions.

16. The method of claim 14, wherein the complex metal catalyst further comprises at least one nitrogen-containing ligand.

17. The method of claim 16, wherein the nitrogen-containing ligand is selected from the group consisting of alkylenediamine ligands, primary monoamines, secondary monoamines, tertiary monoamines, aminoalcohols, oxines, and combinations comprising at least one of the foregoing nitrogen-containing ligands.

18. The method of claim 1, wherein:
(i) the monohydric phenol comprises 2,6-dimethylphenol and 2,3,6-trimethylphenol;
(ii) the solvent is selected from the group consisting of toluene, xylene, and mixtures which contain at least one of toluene and xylene;
(iii) the anti-solvent comprises methanol; and
(iv) the precipitation mixture has a temperature of at least about 44° C. after its formation.

19. The method of claim 18, wherein the precipitation mixture has a temperature of at least about 48° C. after its formation.

20. The method of claim 19, wherein the precipitation mixture has a temperature of at least about 51° C. after its formation.

21. The method of claim 18, wherein the anti-solvent further comprises at least one of toluene and water.

22. The method of claim 18, wherein the anti-solvent comprises about 70 weight % to about 100 weight % methanol; 0 weight % to about 20 weight % toluene; and 0 weight % to about 10 weight % water.

23. The method of claim 1, wherein the temperature of the precipitation mixture is controlled in a manner sufficient to reduce the level of particles smaller than about 38 microns in the precipitated poly(arylene ether), to less than about 18% by weight.

24. A method for preparing a poly(arylene ether), comprising the following steps:
(a) oxidatively coupling 2,6-dimethylphenol and 2,3,6-trimethylphenol in the presence of a complex metal catalyst and a solvent comprising at least one of toluene and xylene, to produce a poly(arylene ether) copolymer resin;
(b) removing a portion of the solvent to produce a concentrated solution having a poly(arylene ether) concentration of about 25 to about 60 weight percent and a cloud point $T_{cloud}$; and
(c) combining the concentrated solution with an anti-solvent which comprises at least about 50 weight % methanol, to precipitate the poly(arylene ether) copolymer in the form of a precipitation mixture;
wherein the concentrated solution has a temperature of at least about ($T_{cloud}-10°$ C.) immediately before it is combined with the anti-solvent; and
wherein the precipitation mixture has a temperature of at least about ($T_{cloud}+10°$ C.) after its formation.

25. The method of claim 24, wherein
the concentrated solution comprises about 25 weight % to about 55 weight % poly(arylene ether);
the complex metal catalyst comprises copper ion, a secondary alkylenediamine ligand, a secondary monoamine, and a tertiary monoamine;
the complex metal catalyst is recovered with an aqueous solution after step (a); and wherein
the precipitated poly(arylene ether) copolymer has an intrinsic viscosity of about 0.25 dL/g to about 0.50 dL/g.

26. A method for preparing a poly(arylene ether), comprising the following steps:
- (I) oxidatively coupling 2,6-dimethylphenol and 2,3,6-trimethylphenol in the presence of a complex metal catalyst and a solvent comprising at least one of toluene and xylene, to produce a poly(arylene ether) copolymer resin;
- (II) removing a portion of the solvent to produce a concentrated solution having a poly(arylene ether) concentration of about 30 to about 60 weight percent and a cloud point $T_{cloud}$; and
- (III) combining the concentrated solution with an antisolvent, to precipitate the poly(arylene ether) copolymer in the form of a precipitation mixture;
  wherein the concentrated solution has a temperature T, immediately before it is combined with the antisolvent; and T satisfies the inequality $$T > ([_s\phi - (0.296 \times IV + 1.27 \times TMP - 35.711] / [1.97(1 \times 0.00795 \times IV - 0.0249 \times TMP] - 10),$$

wherein $\phi_S$ is the polymer concentration (expressed in weight %), IV is the intrinsic viscosity of the copolymer in chloroform at 25° C. (expressed in mL/g), and TMP is the 2,3,6-trimethylphenol content of the copolymer (expressed in weight %); and
wherein the precipitation mixture has a temperature of at least about $T_{cloud}$ after its formation.

27. A poly(arylene ether) copolymer powder prepared according to the method of claim 1, comprising 2,6-dimethyl-1,4-phenylene ether units and 2,3,6-trimethyl-1,4-phenylene ether units, having an intrinsic viscosity of about 0.25 dL/g to about 0.50 dL/g, and containing less than about 18% by weight of particles smaller than about 38 micrometers.

28. The poly(arylene ether) copolymer powder of claim 27, containing less than about 15% by weight of particles smaller than about 38 micrometers.

29. The poly(arylene ether) copolymer powder of claim 27, wherein the weight ratio of 2,6-dimethyl-1,4-phenylene ether units to 2,3,6-trimethyl-1,4-phenylene ether units is about 3:1 to about 6:1; and the copolymer has a Tg of at least about 220° C.

30. A poly(arylene ether) prepared by the method of claim 1, and comprising less than about 18% by weight of particles smaller than about 38 micrometers.

31. A thermoplastic composition comprising the poly(arylene ether) of claim 30.

32. The thermoplastic composition of claim 31, further comprising a polyamide resin.

33. The method of claim 1, wherein the concentrated solution has a temperature of at least about 60° C.

34. The method of claim 1, wherein the concentrated solution has a temperature of at least about 70° C.

35. The method of claim 1, wherein the concentrated solution has a temperature of at least about 80° C.

36. The method of claim 1, wherein the concentrated solution has a temperature of at least about 90° C.

* * * * *